United States Patent
Bentfeld et al.

(10) Patent No.: US 12,160,141 B2
(45) Date of Patent: Dec. 3, 2024

(54) METHOD FOR CONTROLLING A PLANAR DRIVE SYSTEM AND PLANAR DRIVE SYSTEM

(71) Applicant: Beckhoff Automation GmbH, Verl (DE)

(72) Inventors: Lukas Bentfeld, Delbrück (DE); Klaus Neumann, Gütersloh (DE); Keir Maguire, North Vancouver (CA); Dominik Sensen, Herzogenrath (DE); Tim Kaulmann, Paderborn (DE)

(73) Assignee: Beckhoff Automation GmbH, Verl (DE)

( * ) Notice: Subject to any disclaimer, the term of this patent is extended or adjusted under 35 U.S.C. 154(b) by 228 days.

(21) Appl. No.: 17/903,429

(22) Filed: Sep. 6, 2022

(65) Prior Publication Data

US 2023/0006517 A1 Jan. 5, 2023

Related U.S. Application Data

(63) Continuation of application No. PCT/EP2021/056812, filed on Mar. 17, 2021.

(30) Foreign Application Priority Data

Mar. 19, 2020 (EP) ..................................... 20164270

(51) Int. Cl.
*H02P 25/06* (2016.01)
*B65G 54/02* (2006.01)
(Continued)

(52) U.S. Cl.
CPC ............... *H02K 11/20* (2016.01); *H02K 1/12* (2013.01); *H02K 1/27* (2013.01); *H02P 23/14* (2013.01); *H02P 29/60* (2016.02)

(58) Field of Classification Search
CPC ........ H02K 1/27; H02K 41/031; H02K 29/08; H02K 1/12; H02K 11/215; H02K 11/20;
(Continued)

(56) References Cited

U.S. PATENT DOCUMENTS 10,008,915 B2 6/2018 Lu et al.
10,056,816 B2 8/2018 Lu
(Continued)

FOREIGN PATENT DOCUMENTS

DE 102017210673 A1 12/2018
DE 102018006259 A1 12/2019
(Continued)

OTHER PUBLICATIONS

International Search Report and Written Opinion dated Jun. 14, 2021 in connection with International Patent Application No. PCT/EP2021/056812, 23 pages including English translation.
(Continued)

*Primary Examiner* — Burton S Mullins
(74) *Attorney, Agent, or Firm* — Dorsey & Whitney LLP

(57) ABSTRACT

A method for controlling a planar drive system includes determining values of magnetic stator fields for different energizing currents and spatial regions in a two-dimensional array of magnetic field sensors, generating at least one magnetic stator field by applying energizing currents to stator conductors to electrically control a rotor, determining measured values of a total magnetic field via the magnetic field sensors for a plurality of the spatial regions to determine a position of the rotor, compensating contributions of the magnetic stator fields to the measured values of the total magnetic field determined by the magnetic field sensors, generating measured values of the magnetic field determined by the respective magnetic field sensors for the respective space regions, and determining a position of the rotor based (Continued)

on the generated measured values of the magnetic fields. The planar drive system includes at least a controller, a stator module, and a rotor.

13 Claims, 7 Drawing Sheets

(51) Int. Cl.
<table>
<tr><td>G01D 5/14</td><td>(2006.01)</td></tr>
<tr><td>G05D 3/12</td><td>(2006.01)</td></tr>
<tr><td>H02K 1/12</td><td>(2006.01)</td></tr>
<tr><td>H02K 1/27</td><td>(2022.01)</td></tr>
<tr><td>H02K 11/20</td><td>(2016.01)</td></tr>
<tr><td>H02K 11/215</td><td>(2016.01)</td></tr>
<tr><td>H02K 29/08</td><td>(2006.01)</td></tr>
<tr><td>H02K 41/03</td><td>(2006.01)</td></tr>
<tr><td>H02P 23/00</td><td>(2016.01)</td></tr>
<tr><td>H02P 23/14</td><td>(2006.01)</td></tr>
<tr><td>H02P 29/60</td><td>(2016.01)</td></tr>
</table>

(58) Field of Classification Search
CPC ..... H02K 2201/18; H02P 29/60; H02P 25/06; H02P 23/14; H02P 23/0031; H02P 23/0018; G01D 5/145; G01D 2205/90; B65G 54/00

See application file for complete search history.

(56) References Cited

U.S. PATENT DOCUMENTS

<table>
<tr><td>10,116,195 B2</td><td>10/2018</td><td>Lu</td></tr>
<tr><td>10,222,237 B2</td><td>3/2019</td><td>Lu</td></tr>
<tr><td>10,348,177 B2</td><td>7/2019</td><td>Lu</td></tr>
<tr><td>10,763,733 B2</td><td>9/2020</td><td>Lu</td></tr>
<tr><td>11,250,318 B2</td><td>2/2022</td><td>Foong et al.</td></tr>
<tr><td>11,430,683 B2</td><td>8/2022</td><td>Raatz et al.</td></tr>
<tr><td>2015/0241525 A1</td><td>8/2015</td><td>Yang et al.</td></tr>
<tr><td>2021/0273592 A1*</td><td>9/2021</td><td>Luthe .................... H02P 25/064</td></tr>
</table>

FOREIGN PATENT DOCUMENTS

<table>
<tr><td>WO</td><td>2013059934 A1</td><td>5/2013</td></tr>
<tr><td>WO</td><td>2014182246 A1</td><td>11/2014</td></tr>
<tr><td>WO</td><td>2015017933 A1</td><td>2/2015</td></tr>
<tr><td>WO</td><td>2015179962 A1</td><td>12/2015</td></tr>
<tr><td>WO</td><td>2015184553 A1</td><td>12/2015</td></tr>
<tr><td>WO</td><td>2015188281 A1</td><td>12/2015</td></tr>
<tr><td>WO</td><td>2017004716 A1</td><td>1/2017</td></tr>
</table>

OTHER PUBLICATIONS

International Preliminary Report on Patentability dated Jul. 6, 2022 in connection with International Patent Application No. PCT/EP2021/056812, 36 pages including English translation.

Extended European Search Report dated Oct. 15, 2020 in connection with European patent application No. 20164270.9, 23 pages including English translation.

English translation of German patent publication No. DE 10 2017 210 673 A1, published Dec. 27, 2018, 40 pages.

* cited by examiner

METHOD FOR CONTROLLING A PLANAR DRIVE SYSTEM AND PLANAR DRIVE SYSTEM

CROSS-REFERENCE TO RELATED APPLICATIONS

This patent application is a continuation of International Patent Application PCT/EP2021/056812, filed Mar. 17, 2021, entitled "Method for Controlling a Planar Drive System, and Planar Drive System," which claims the priority of European patent application EP 20 164 270.9, filed Mar. 19, 2020, entitled "Verfahren zum Steuern eines Planarantriebssystems and Planarantriebssystem," the disclosure content of each of which is hereby incorporated by reference, in the entirety and for all purposes.

FIELD

The present application relates to a method for controlling a planar drive system, and to a planar drive system configured to carry out the method for controlling a planar drive system.

BACKGROUND

Planar drive systems may be used, among other things, in automation technology, in particular manufacturing technology, handling technology and process engineering. Planar drive systems may be used to move or position a moving element of a system or machine in at least two linearly independent directions. Planar drive systems may comprise a permanently energized electromagnetic planar motor with a planar stator and a rotor movable on the stator in at least two directions.

In a permanently energized electromagnetic planar motor, a driving force is exerted on the rotor by current-carrying conductors magnetically interacting with driving magnets of a magnet arrangement. The application particularly relates to embodiments of planar drive systems in which the drive magnets of an electric planar motor are arranged on the rotor and the current-carrying conductors of the planar motor are arranged in a stationary planar stator.

In such a drive system, the rotor comprises at least a first magnet assembly for driving the rotor in a first direction and a second magnet assembly for driving the rotor in a second direction linearly independent of the first direction, e.g. in a second direction orthogonal to the first direction. The planar stator includes at least one group of first energizable conductors magnetically interacting with the magnets of the first magnet assembly to drive the rotor in the first direction, and a group of second energizable conductors magnetically interacting with the magnets of the second magnet assembly to drive the rotor in the second direction. The first and second groups of conductors are generally independently energizable to allow independent movement of the rotor in the first and second directions. If the conductors of the first and second groups themselves may be energized independently of one another at least in parts, a plurality of rotors may be moved independently of each other on one stator at the same time.

Publications WO 2013/059934 A1, WO 2015/017933 A1, WO 2015/179962 A1, WO 2015/184553 A1, WO 2015/188281 A1, WO 2017/004716 A1 each describe planar drive systems (displacement devices) comprising an electromagnetic planar motor with a permanently energized rotor and a stator comprising a plurality of current-carrying conductors.

To control a rotor of a planar drive system, it is essential to be able to determine a position of the rotor relative to the stator module or stator modules of the planar drive system. For this purpose, each stator module comprises at least a sensor module with a plurality of magnetic field sensors that are set up to detect the magnetic field of the rotor, thereby allowing for determining a position of the rotor relative to the respective sensor module or relative to the respective stator module. The more precisely such a determination of a position of the rotor may be performed, the more precisely a control of the planar drive system may be carried out.

SUMMARY

A method for controlling a planar drive system is provided that allows for improved and more precise control of a rotor due to improved position determination of the rotor. Further a planar drive system is provided which is arranged to carry out the method for controlling a planar drive system.

EXAMPLES

A method for controlling a planar drive system is provided, the planar drive system comprising at least a controller, a stator module and a rotor, the stator module comprising a plurality of electrically energizable stator conductors for generating magnetic stator fields for electrically controlling the rotor, the rotor having a magnet arrangement for generating a magnetic rotor field, wherein a magnetic coupling between the rotor and the stator module is achievable via the magnetic stator field and the magnetic rotor field, wherein the stator module comprises a sensor module having a plurality of magnetic field sensors for determining a position of the rotor, wherein the magnetic field sensors are arranged in a two-dimensional array at the stator module, and wherein each magnetic field sensor is arranged to determine the magnetic rotor field for a spatial region in the two-dimensional array, comprising:

determining a plurality of values of magnetic stator fields for a plurality of different energizing currents and for a plurality of spatial regions in the two-dimensional array of magnetic field sensors in a first magnetic stator field determining step;

generating at least one magnetic stator field by applying corresponding energizing currents to corresponding stator conductors to electrically control the rotor in a magnetic stator field generating step;

determining a plurality of measured values of a total magnetic field via a plurality of magnetic field sensors for a plurality of spatial regions of the sensor module to determine a position of the rotor in a total magnetic field determining step, wherein the total magnetic field comprises a superposition of the plurality of magnetic stator fields and the magnetic rotor field;

compensating contributions of the magnetic stator fields to the measured values of the total magnetic field determined by the magnetic field sensors and generating measured values of the magnetic rotor field determined by the respective magnetic field sensors for the respective spatial region in a compensating step, wherein compensating comprises subtracting the values of the magnetic stator fields determined for the energizing currents from the measured values of the total magnetic field determined by the magnetic field sensors; and determining a position of the rotor based on the generated measured values of the magnetic rotor field in a position determining step.

This achieves the technical advantage that a method for controlling a planar drive system may be provided, which allows for an improved control of the rotor of the planar drive system due to a precise position determination of the rotor.

A position determination of the rotor relative to the stator module is carried out via a plurality of measurements of the magnetic rotor field by the plurality of magnetic field sensors of the sensor module of the stator module. For this purpose, the plurality of magnetic field sensors are arranged in a two-dimensional array on the stator module. Based on the plurality of measured values of the magnetic rotor field, a relative positioning of the rotor with respect to the stator module may be derived. The positioning of the rotor by the stator module is effected by generating corresponding magnetic stator fields, i.e. magnetic fields of the stator conductors of the stator module. As a result, the magnetic field sensors arranged on the stator module measure a superposition of the magnetic stator fields of the stator module generated by the stator conductors in addition to the magnetic rotor field of the rotor, since the magnetic field sensors of the sensor module are arranged adjacent to the stator conductors at the stator module in such a way that the magnetic field sensors also measure substantial portions of the magnetic stator field in addition to the magnetic rotor field. This leads to a distortion of the measured values of the magnetic rotor field and thus to a reduction in the precision when determining the position of the rotor relative to the stator module.

By compensating the contributions of the magnetic stator fields to the measured values of a total magnetic field recorded by the magnetic field sensors, which includes superpositions of the magnetic rotor field and the magnetic stator fields, the contribution of the magnetic rotor field to the measured total magnetic field may be isolated. This allows for accurately determining the magnetic rotor field by the plurality of magnetic field sensors. This, in turn, allows for precisely determining the position of the rotor relative to the stator module. This, in turn, allows for improved control of the rotor by allowing it to be precisely positioned at accurately determined positions on the stator module.

By determining a plurality of values of magnetic stator fields for a plurality of different energizing currents and for a plurality of spatial regions in the two-dimensional array of the magnetic field sensors, a compensation of the contributions of the magnetic stator fields for any energizing currents and for any spatial regions on the stator module may be achieved. This, in turn, makes the determination of the position of the rotor and thus the control of the rotor more precise and thus improved.

For a planar drive system having a plurality of stator modules, a plurality of values of magnetic stator fields may be determined individually for each stator module according to the magnetic stator field determining step, which are used according to the method for controlling a planar drive system. Alternatively, a plurality of values of magnetic stator fields may be determined for a stator module to be used as reference values for the plurality of stator modules according to the method for controlling a planar drive system. Alternatively, a set of values of the magnetic stator field may be created for the plurality of stator modules, each value of the set corresponding to an average value of the values of the respective stator fields created individually for the plurality of stator modules.

BRIEF DESCRIPTION OF THE DRAWINGS

The present invention is described in more detail with reference to the accompanying figures, in which.

DETAILED DESCRIPTION

Figure 1:
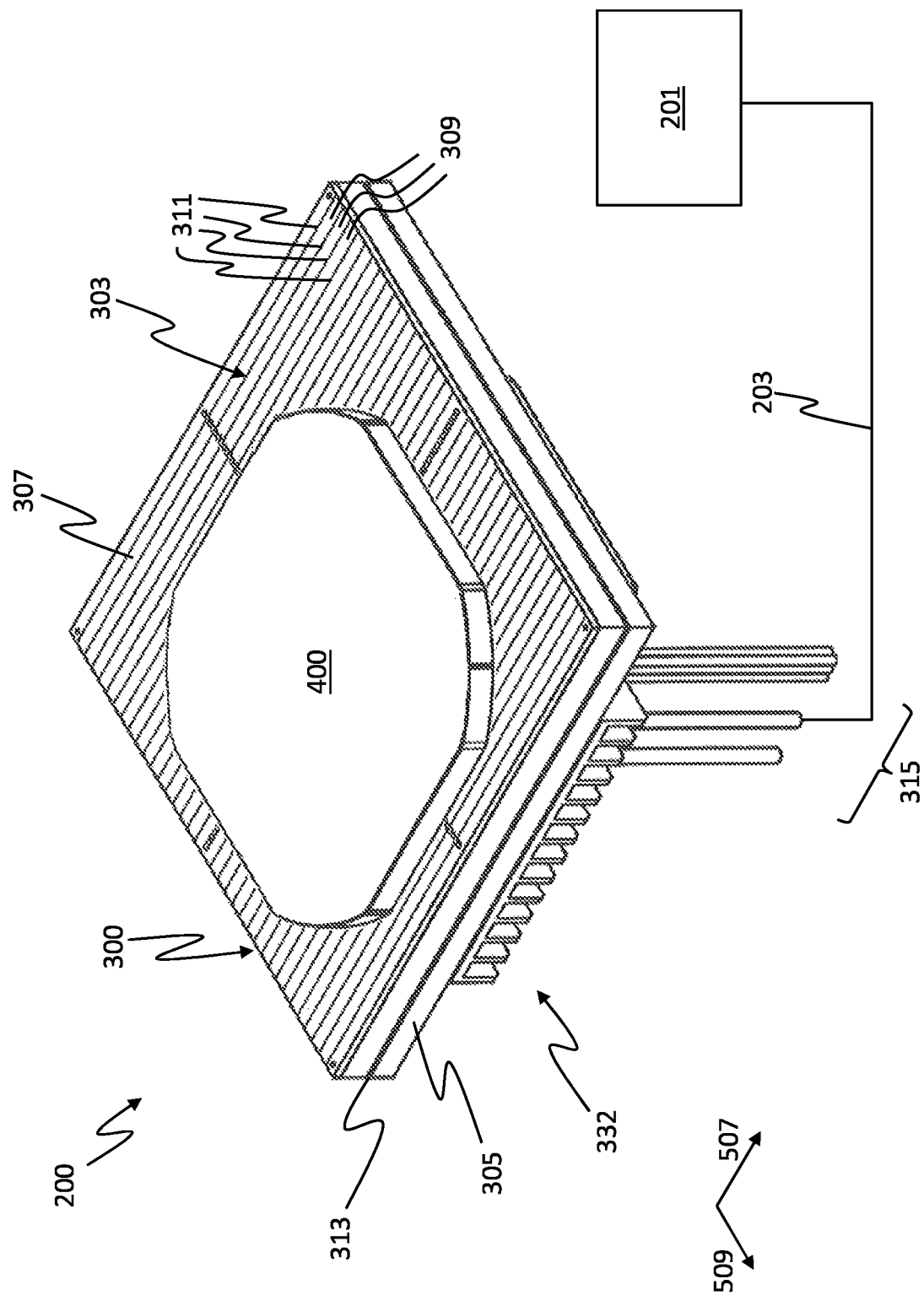
FIG. 1 is a schematic depiction of a planar drive system comprising a stator module and a rotor according to an embodiment.

For the purposes of the application, a magnetic rotor field is a magnetic field generated by the rotor of the planar drive system. For the purposes of the application, a magnetic stator field is a magnetic field generated by a stator conductor of the stator module of the planar drive system.

For the purposes of the application, a stator conductor is an electrically conductive conductor element that may be energized and is set up to generate a magnetic field.

For the purposes of the application, an energizing current is a current applied to a stator conductor to generate a magnetic stator field.

A value of a magnetic stator field, a magnetic rotor field or a total magnetic field may comprise in the following a field strength, a field direction of the respective magnetic field respectively, an amplitude and/or an angle of the respective magnetic flux density for any point in space. A value of the magnetic stator field may particularly be expressed by three orthogonally oriented vector components, wherein components of the magnetic stator field parallel or antiparallel to three predefined spatial directions are determined by the three vector components.

In the following, a magnetic stator field may be a magnetic field of a single stator conductor. Alternatively, a magnetic stator field may be a superposition of individual magnetic fields of different stator conductors.

According to an embodiment, determining the values of the magnetic stator fields in the first magnetic stator field determining step is carried out by a plurality of measurements of a plurality of magnetic field sensors of the sensor module.

This achieves the technical advantage that determining the plurality of values of magnetic stator fields for a plurality of different energizing currents and for a plurality of spatial regions at the stator module may be performed by the stator module. By this, it may be achieved that a compensation of the contributions of the magnetic stator fields to the measured values of the total magnetic field may be performed during the operation of the planar drive system.

For this purpose, different magnetic stator fields may be generated by applying different energizing currents to different stator conductors of the stator module and corresponding measured values may be recorded by the plurality of magnetic field sensors of the sensor module of the stator module without the presence of a rotor or without the influence of a magnetic rotor field. The recorded values of the magnetic stator fields on the corresponding energizing currents may be stored in corresponding data sets. When operating the planar drive system or when driving the rotor by generating corresponding magnetic stator fields, contributions of these magnetic stator fields to the measured values of the total magnetic field recorded by the magnetic field sensors may be determined and compensated for.

This allows a high flexibility of the compensation by determining the magnetic stator fields for different energizing currents and different spatial regions of the stator module at arbitrary times during operation of the planar drive system. Thus, operation-related changes in the magnetic stator fields of the stator module may be taken into account in the compensation. Hereby, a position determination of the rotor and, in connection to this, a control of the rotor may be further specified and improved.

According to an embodiment, at least one measured value of the total magnetic field is determined for each magnetic field sensor in the total magnetic field determining step; and wherein in the compensating step contributions of the magnetic stator fields to the measured values of the total magnetic field are compensated for each magnetic field sensor, and wherein for each magnetic field sensor at least one measured value of the magnetic rotor field is generated for the spatial area of the respective magnetic field sensor.

This achieves the technical advantage that precise position determining and, associated with this, precise control of the rotor of the planar drive system is possible. By correcting the measured values of the total magnetic field recorded by the respective magnetic field sensor for each magnetic field sensor of the sensor module of the stator module with respect to the contributions of the magnetic stator fields to the measured values of the total magnetic field recorded by the magnetic field sensors, a precise determination of the magnetic rotor field for the respective spatial area of the magnetic field sensor may be achieved for each magnetic field sensor. This improves the precision of the position determination of the magnetic rotor field relative to the stator module and thus the control of the rotor.

According to an embodiment, the first magnetic stator field determining step comprises:
  determining model descriptions of dependencies between energizing currents and magnetic stator fields of stator conductors in a model determining step;
  wherein the compensating step comprises:
  compensating the contributions of the magnetic stator fields to the measured values of the total magnetic field determined by the magnetic field sensors for arbitrary energizing currents based on the determined model descriptions of the dependencies between the energizing currents and the magnetic stator fields of the stator conductors.

This provides the technical advantage of achieving precise position determination and accurate control of the rotor of the planar drive system. On the basis of a model description of dependencies between energizing currents and magnetic stator fields for a plurality of stator conductors of the stator module based on the values of magnetic stator fields for a plurality of different energizing currents determined in the magnetic stator field determining step, values of the associated magnetic stator fields may be determined based on the respective model description for any energizing currents.

This allows for magnetic stator fields to be determined for energizing currents for which no values of the respective magnetic stator field were determined or measured in the magnetic stator field determining step. Based on the model descriptions, corresponding compensations of the contributions of the respective magnetic stator fields of any energizing currents to the measured values of the total magnetic field determined by the magnetic field sensors may be compensated. This results in improved compensation and correction of the measured values of the total magnetic field determined by the magnetic field sensors and, associated with this, improved determination of the magnetic rotor field, in that contributions of magnetic stator fields of any energizing currents may be compensated for and corresponding measured values of the magnetic field sensors may be corrected.

According to an embodiment, in the model determining step an individual model description of the dependence between the energizing currents applied to the respective stator conductor and the magnetic stator fields generated by the respective stator conductor is determined for each stator conductor, and wherein, in the compensating step, the contributions of the magnetic stator fields to the measured values of the total magnetic field determined by the respective magnetic field sensor are compensated for each magnetic field sensor on the basis of the models created, and measured values of the magnetic rotor field are determined.

This achieves the technical advantage that a precise position determination and associated with this a precise and accurate control of the rotor of the planar drive system is possible. By taking an individual model description of the dependency between energizing currents and magnetic stator fields generated by the respective stator conductor into account for each stator conductor of the stator module, a further specification of the determination of the respective magnetic stator fields may be achieved.

This, in turn, may improve compensation of the contributions of the respective magnetic stator fields to the values of the total magnetic field measured by the magnetic field sensors. This, in turn, contributes to an improved determining of the magnetic rotor field based on the measured values of the individual magnetic field sensors. This, in turn, leads to improved position determination and, consequently, improved control of the rotor of the planar drive system.

According to an embodiment, the model description of the dependence between the energizing currents applied to the respective stator conductor and the magnetic stator fields generated by the respective stator conductor in the model determining step comprises a correspondingly trained neural network, wherein the correspondingly trained neural network is set up to determine values of the corresponding magnetic stator field for any stator conductor and any energizing currents for any spatial regions of any magnetic field sensors.

This provides the technical advantage that precise determining of the expected magnetic stator fields may be carried out for each stator conductor and a variety of different energizing currents for the spatial areas of the magnetic field sensors of the sensor module.

According to an embodiment, the compensation in the compensating step is carried out by a correspondingly trained neural network, wherein the correspondingly trained neural network is set up, for each magnetic field sensor, to compensate the contributions of the magnetic stator fields to the measured values of the total magnetic field determined by the respective magnetic field sensor and to determine measured values of the magnetic rotor field.

This has the technical advantage that precise compensation of the influences of the magnetic stator fields of the stator conductors may be achieved for each magnetic field sensor.

Alternatively, a plurality of different trained neural networks may be used. In particular, an individually trained neural network may be used for each stator module.

According to an embodiment, the method for controlling a planar drive system further comprises:
  calibrating the stator conductors in a calibrating step.

This achieves the technical advantage of improved determination of the magnetic stator fields of the stator module and improved control of the rotor of the planar drive system. By calibrating the individual stator conductors, a relationship between the applied energizing current and the magnetic stator field generated by the respective stator conductor may be precisely determined for each stator conductor. In this way, a desired magnetic stator field may be generated specifically for each stator conductor by applying the respective energizing current. This allows for controlling the rotor as precisely as possible by precisely generating the desired magnetic stator field required to position the rotor in a specific position on the stator module. Furthermore, precisely generating the magnetic stator fields allows for more precisely determining the magnetic stator fields of the stator module in the magnetic stator field determining step and, associated with this, for more precisely compensating the contributions of the respective magnetic stator fields to the measured values of the total magnetic field measured by the magnetic field sensors. Thus, by calibrating the stator conductors, a more precise position determination of the rotor may in turn be achieved by the measured values of the magnetic field sensors of the sensor module of the stator module.

According to an embodiment, the calibrating step comprises:
  determining a plurality of target magnetic stator fields for a plurality of target energizing currents for a plurality of stator conductors in a target magnetic stator field determining step, wherein a target magnetic stator field of a stator conductor corresponds to a magnetic field of an ideal reference conductor having the same parameters as the respective stator conductor for a respective target energizing current;
  generating, on the basis of the target energizing currents, real magnetic stator fields of the stator conductors in a generating step, wherein a real magnetic stator field of a stator conductor is a magnetic field generated by the respective stator conductor for the respective target energizing current;
  determining values of the real magnetic stator fields for the target energizing currents of the plurality of stator conductors in a second magnetic stator field determining step;
  defining allocations between the target energizing currents and the corresponding real magnetic stator fields for a plurality of stator conductors in an allocating step; and
  determining, based on the allocations, real energizing currents for the plurality of stator conductors in an energizing current determining step, wherein a real energizing current of a stator conductor corresponds to a target energizing current for which the respective stator conductor generates a corresponding real magnetic stator field.

This achieves the technical advantage of allowing for precisely calibrating of the stator conductors. This, in turn, results in improved position determining and improved control of the rotor of the planar drive system. By calibrating individual stator conductors, production-related irregularities in the properties of the individual stator conductors or in the positioning of the stator conductors on the stator module may be taken into account and corrected. By determining an individual relationship between the applied energizing current and the generated magnetic stator field for each stator conductor, an exact determination of the magnetic stator field generated by the respective stator conductor may be made for each stator conductor independently of the production-related irregularities in the embodiment of the individual stator conductors or in the positioning of the individual stator conductors in the stator module. For each stator module, it is thus possible to specifically generate the desired magnetic stator field that is required to control the rotor and to position the rotor in a desired position relative to the stator module. This may provide improved control of the planar drive system.

According to an embodiment, determination of the values of the real magnetic stator fields in the second magnetic stator field determining step is carried out by a plurality of measurements of a plurality of magnetic field sensors of the sensor module.

This achieves the technical advantage that an increased flexibility and applicability of the method for controlling a planar drive system is allowed for. By performing the determination of the real magnetic stator fields in the second magnetic stator field determining step via the magnetic field sensors of the sensor module of the stator module, the calibration of the stator conductors may be calibrated by the stator module. Thus, for an already installed stator module of the planar drive system, calibration of the respective stator conductors of the stator module may be carried out in an already installed state. Calibration of the stator conductors of the stator module may thus also be performed during operation of the planar drive system.

According to an embodiment, the method for controlling a planar drive system further comprises:
  calibrating the magnetic field sensors in a sensor calibrating step.

This achieves the technical advantage that precise position determining and, associated with this, precise control of the rotor of the planar drive system may be achieved. By calibrating the magnetic field sensors, the accuracy of the measured values of the total magnetic field of the magnetic field sensors may be improved. With a higher accuracy of the measured values of the magnetic field sensors, a determination of the magnetic rotor field using the magnetic field sensors of the sensor module may be improved. This may improve a determination of the position of the rotor via the measurements of the magnetic field sensors and thus a control of the rotor of the planar drive system.

According to an embodiment, the calibrating step comprises:
  generating a first reference magnetic field in a first reference magnetic field generating step, wherein values of the first reference magnetic field are known for a plurality of spatial regions of the stator module;
  determining measured values of the reference magnetic field for a plurality of spatial regions of the stator module using a plurality of magnetic field sensors in a first reference magnetic field determining step;
  determining, for a plurality of magnetic field sensors, deviations of the measured values of the reference magnetic field determined by the magnetic field sensors from the known values of the reference magnetic field in the respective spatial regions in a deviation determining step;

correcting, based on the determined deviations, the measured values of the total magnetic field and/or the magnetic rotor field and/or the magnetic stator fields determined by the magnetic field sensors in a correcting step.

This has the technical advantage that a more precise calibration of the magnetic field sensors may be achieved and thus an improvement in the precision of the measured values of the magnetic field sensors. By determining a relation between actually applied magnetic field and real magnetic field measured by the magnetic field sensor for each magnetic field sensor of the sensor module, a precise calibration of each individual magnetic field sensor of the sensor module may be performed. Calibration of the individual magnetic field sensors allows for precise determining of the magnetic field measured by the respective magnetic field sensor. This allows for an exact determination of the magnetic rotor field by the individual magnetic field sensors of the sensor module. This, in turn, may be used to achieve precise position determination and, associated with this, precise control of the rotor.

According to an embodiment, the sensor calibrating step further comprises:

determining a plurality of different temperatures of the stator module in a temperature determining step;

generating a second reference magnetic field in a second reference magnetic field generating step, wherein values of the second reference magnetic field are known for a plurality of spatial regions;

determining, by a plurality of magnetic field sensors, a plurality of measured values of the second reference magnetic field for the plurality of temperatures and a plurality of spatial regions in a second reference magnetic field determining step;

determining temperature dependencies of the measured values of the second reference magnetic field determined by the magnetic field sensors based on the values of the second reference magnetic field in a dependency determining step; and correcting the measured values of the total magnetic field and/or the magnetic rotor field and/or the magnetic stator fields determined by the magnetic field sensors on the basis of the determined temperature dependencies in a correcting step.

This achieves the technical advantage that precise position determining of the rotor and associated precise control of the rotor may be provided. By taking into account the temperature of the stator module and, associated with this, the temperature of the individual magnetic field sensors of the sensor module, temperature influences on the individual sensors and associated falsifications of the measured values of the individual magnetic field sensors may be taken into account.

This may increase the precision of the individual magnetic field sensors. By determining for each magnetic field sensor, a relationship between the temperature of the sensor module or the temperature of the magnetic field sensor and the deviation between an applied magnetic field and the measured value measured by the respective magnetic field sensor, corresponding temperature influences on the measured values of the total magnetic field measured by the magnetic field sensor may be taken into account during operation of the planar drive system for each magnetic field sensor and the respective measured values may be corrected. Temperature-related falsifications of the measured values of the individual magnetic field sensors of the sensor module may thus be prevented.

This may increase the accuracy of the measurements of the individual magnetic field sensors of the sensor module. Associated with this, a precision when determining of the magnetic rotor field may be increased by the measurements of the individual magnetic field sensors of the sensor module. This, in turn, may make position determination and, associated with this, control of the rotor more precise and improved.

According to an embodiment, the first reference magnetic field and/or the second reference magnetic field is the magnetic rotor field of the rotor or the magnetic stator field of the stator module.

This has the technical advantage that an increased precision of the position determination or control of the rotor may be achieved by the fact that a calibration of the magnetic field sensors of the sensor module may be carried out during operation of the planar drive system. By generating the first and second reference magnetic fields required for calibration of the individual magnetic field sensors of the sensor module by via the magnetic rotor field of the rotor or the magnetic stator fields of the individual stator conductors or of the stator module, calibration of the magnetic field sensors and consideration of the temperature influences of the magnetic field sensors may be carried out by a stator module that is already installed and in operation or by an associated rotor of the planar drive system. Since the first and second reference magnetic fields are provided by the magnetic rotor field of the rotor and the magnetic stator fields of the stator module, respectively, an external magnetic field source and an external calibration arrangement, respectively, by which the first and second reference magnetic fields are generated, may be dispensed with. This increases the flexibility of the sensor calibration.

By calibrating the magnetic field sensors of the sensor module, including determining of the temperature behavior of the sensors, sensor-internal errors that occur during the manufacture of the magnetic field sensor or incorrect positioning of the respective magnetic field sensor in the sensor module of the stator module may be taken into account and corrected.

According to an embodiment, the method further comprises: varying the first reference magnetic field and/or the second reference magnetic field for a plurality of spatial regions in a varying step.

This achieves the technical advantage that a calibration of the magnetic field sensors of the sensor module may be improved. By varying the first and/or second reference magnetic fields for the spatial regions of the magnetic field sensors, a detailed data set for the calibration of the magnetic field sensors may be generated for a plurality of different reference magnetic fields. This allows the calibration of the magnetic field sensors to be more precise. A variation of the first and second reference magnetic fields may comprise a variation of the magnetic field strength as well as the magnetic field direction or the amplitude and the angle of the magnetic flux density for any spatial point.

According to an embodiment, the method for controlling a planar drive system further comprises:

creating a calibration file in a calibration file creating step, the calibration file comprising the values determined and information obtained in the magnetic stator field determining step and/or the values determined and information obtained in the calibrating step and/or the values determined and information obtained in the sensor calibrating step.

This achieves the technical advantage that certain values and determined information of the individual method steps may be stored and reused for re-calibrating the individual components. This simplifies and accelerates the method when it is carried out again. The values and information of the calibration file may be used as corresponding values and information in the magnetic stator field determining step, the calibrating step and the sensor calibrating step when the method is carried out again. In particular, the calibration file may comprise model descriptions, especially mathematical functions or appropriately trained neural networks, which are set up to determine values of the corresponding magnetic stator field for any stator conductor and any energizing currents for any spatial regions of any magnetic field sensors.

Alternatively, the magnetic stator field determining step, the calibrating step and the sensor calibrating step may be carried out on site, so that a user of the planar drive system may perform the method for controlling a planar drive system and in particular the magnetic stator field determining step, the calibrating step and the sensor calibrating step with the corresponding values and information of the calibration file on the basis of the created calibration file, which the user may e.g. download from a server. The connection between a special calibration file and a stator module may in this context be established via a unique identification number, which is stored on the stator module and in the calibration file, respectively. Alternatively, the calibration file may be stored in the respective stator module itself. The calibration file may also be exchanged between a server and/or a controller and/or the stator module.

A planar drive system is provided, wherein the planar drive system comprises at least a controller, a stator module and a rotor, wherein the controller is connected to the stator module via at least one data link, wherein the stator module comprises a plurality of electrically energizable stator conductors for generating magnetic stator fields for electrically controlling the rotor, wherein the rotor comprises a magnet arrangement for generating a magnetic rotor field, wherein a magnetic coupling between the rotor and the stator module may be achieved via the magnetic stator field and the magnetic rotor field, wherein the stator module comprises a sensor module having a plurality of magnetic field sensors for determining a position of the rotor, wherein the magnetic field sensors are arranged in a two-dimensional array on or in the stator module, wherein each magnetic field sensor is arranged to determine the magnetic rotor field for a spatial region in the two-dimensional array, and wherein the controller is arranged to execute a method for controlling a planar drive system.

In this way, a planar drive system may be provided that has precise and improved control and is embodied to perform the method with the advantages mentioned.

FIG. 1 shows a schematic view of a planar drive system 200 with a stator module 300 and a rotor 400.

According to the embodiment in FIG. 1, the planar drive system comprises a controller 201, a stator module 300 and a rotor 400. The controller 201 is connected to the stator module 300 via a data link 203. The controller 201 is embodied to execute a method for controlling a planar drive system 200.

For a detailed description of the method for controlling a planar drive system 200 and its operation, please refer to the description of FIGS. 4 to 7.

The stator module 300 has a planar stator surface 303. The planar stator surface 303 is arranged on an upper surface of a stator module housing 305. A rotor 400 is arranged above the stator surface 303. The stator surface 303 is part of a stator assembly 307 for an electric drive of the rotor 400. The stator assembly 307 with the stator surface 303 may be embodied as a printed circuit board. The stator surface 303 is embodied as a square.

The rotor 400 may be driven above the stator surface 303 in at least a first direction 507 and a second direction 509. The stator surface 303 comprises a plurality of stator conductors 309, which in the embodiment shown in FIG. 1 are embodied as conductor strips, and which are aligned substantially along the first direction 507. The stator conductors 309 are embodied to conduct current and may be energized to drive the rotor 400. A stator conductor gap 311 is provided between the stator conductors 309, by which the stator conductors 309 are electrically isolated from one another. Below the stator surface 303, another arrangement of stator conductors may be provided in which the stator conductors 309 are aligned substantially along the second direction 509.

Electronics modules for driving and controlling the rotor 400 are arranged in the stator module housing 305. For example, the electronics modules may include power modules for generating the drive currents and control modules for controlling the power modules and the drive currents. On a stator module bottom surface 332 of the stator module housing 305 opposite to the stator surface 303, connections are arranged for connecting the stator module 300 to a plurality of connecting lines 315. The connecting lines 315 may e.g. comprise a control line for transmitting control signals for the control modules and a power supply line for supplying electrical power to the power and/or control modules. In particular, electrical energy may be supplied to the power module via the power supply line to generate the drive currents.

The stator module housing 305, the stator assembly 307 and the stator surface 303 are rectangular, in particular square, when viewed from above the stator surface 303.

The stator module housing 305 comprises a sectional plane 313. A sensor module may be arranged within the stator module housing 305 at the level of the sectional plane 313.

Figure 2:
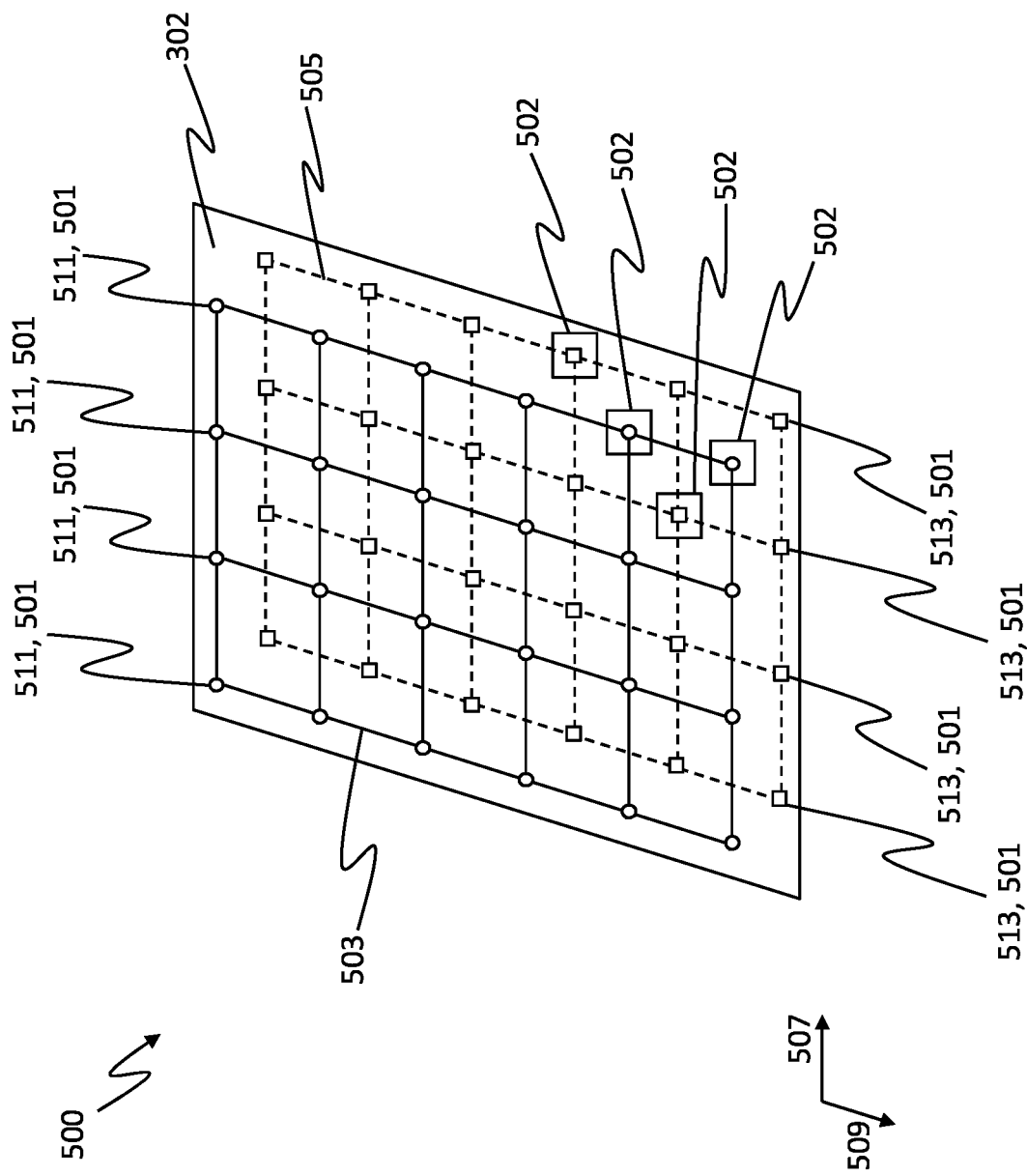
FIG. 2 shows a schematic and perspective view of a sensor module of the stator module according to an embodiment.

FIG. 2 shows a perspective view of a sensor module 500 for detecting a position of the rotor 400 in the planar drive system 200. The sensor module 500 is rectangular and has a two-dimensional array of magnetic field sensors 501 on a carrier 302 of the stator module 300. Thus, the magnetic field sensors 501 are arranged on the carrier 302. The two-dimensional array of magnetic field sensors 501 comprises a first periodic grid 503 of magnetic field sensors 501 and a second periodic grid 505 of magnetic field sensors 501. The magnetic field sensors 501 of the first grid 503 are indicated by round symbols, while the magnetic field sensors 501 of the second grid 505 are indicated by square symbols. Alternatively, the sensor module 500 may have a square, parallelogram or other embodiment.

Where reference is made to magnetic field sensors 501 in general in the following, reference numeral 501 is used.

The first magnetic field sensors 511 are connected with solid lines to illustrate the grid structure of the first grid 503. The second magnetic field sensors 513 are connected with dashed lines to illustrate the grid structure of the second grid 505. The first magnetic field sensors 511 and the second magnetic field sensors 513 may be identical, and the round and square symbols, respectively, are only intended to symbolize the positions of the magnetic field sensors 501 associated with the respective sub-arrays.

The first grid 503 and the second grid 505 have identical structures and are shifted relative to each other. As a result, the second magnetic field sensors 513 of the second grid 505 and the first magnetic field sensors 511 of the first grid 503 are each shifted relative to each other.

The array of magnetic field sensors 501 shown in FIG. 2 is for illustrative purposes only and may differ from the form shown in FIG. 2.

The magnetic field sensors 501 are each set up to determine magnetic fields for a spatial area 502. Measurements of a magnetic field sensor 501 are thus limited to the respective spatial area 502 of the respective magnetic field sensor 501. In the embodiment of FIG. 2, the spatial areas 502 are shown as rectangular or square areas. This is merely due to depictional reasons. The spatial regions 502 of the magnetic field sensors 501 may also have geometrically different spatial extents and e.g. be circular in shape. In particular, the spatial regions 502 may have a point-shaped embodiment, so that point measurements of the respective magnetic fields may be carried out by the magnetic field sensors 502, in which individual magnetic field sensors 502 exclusively measure field contributions of the respective magnetic fields that are arranged directly at the position of the respective magnetic field sensors 501.

The carrier 302 is flat so that the magnetic field sensors 501 are arranged in a plane, i.e., in a two-dimensional array.

The magnetic field sensors 501 may be embodied as Hall sensors. In particular, the magnetic field sensors 501 may be embodied as 2D or 3D Hall sensors, where 3D Hall sensors measure the magnetic field components in three linearly independent spatial directions. In particular, these spatial directions may comprise the first direction 507 and the second direction 509 as well as a third direction perpendicular to the first direction 507 and the second direction 509.

The carrier 302 may be formed as a printed circuit board and/or a circuit board. Thus, the carrier 302 may be provided in a simple manner.

The array of magnetic field sensors 501 may comprise exactly two sub-arrays of the two grids 503, 505.

Figure 3:
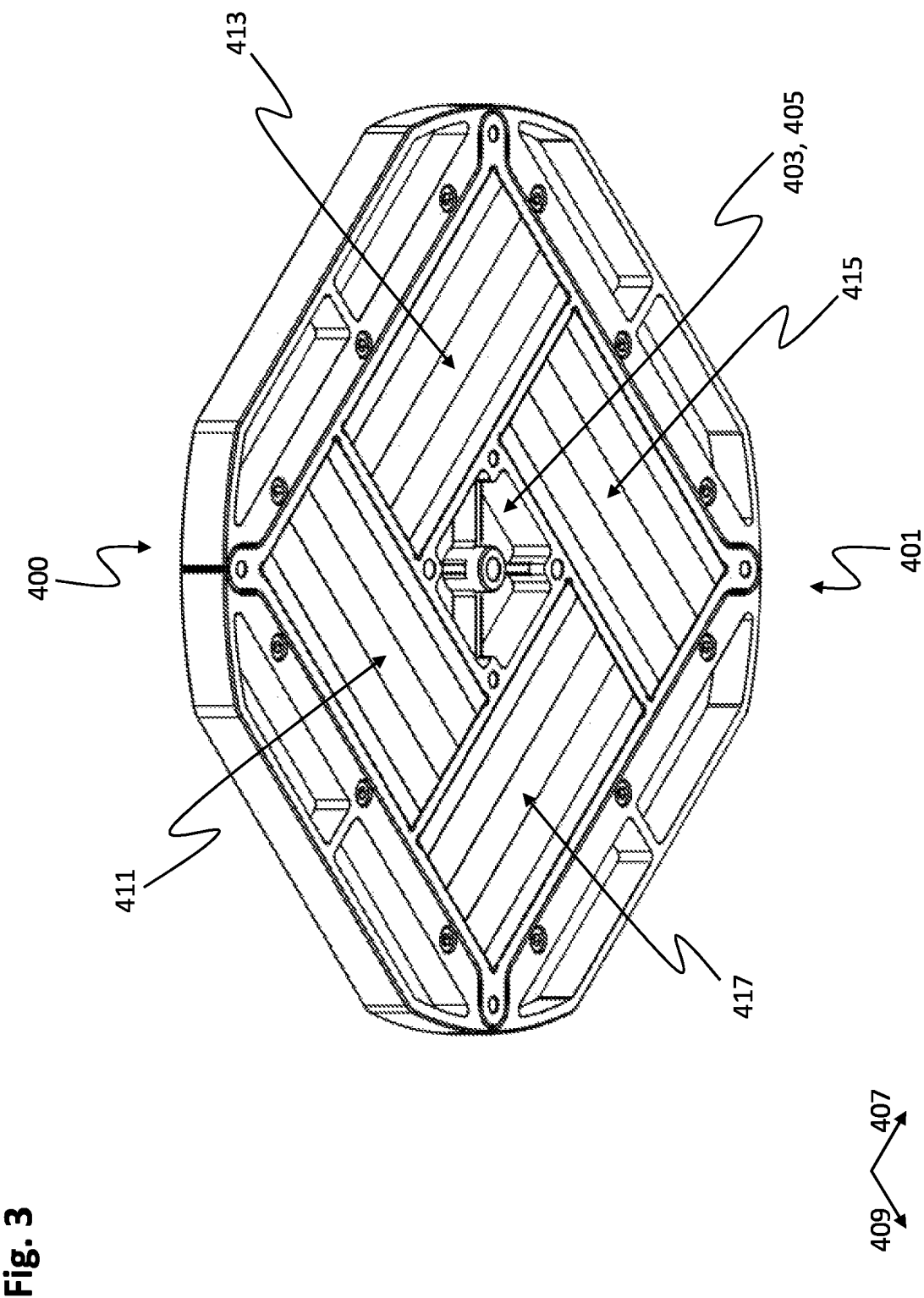
FIG. 3 shows a schematic depiction of an underside of a rotor according to a further embodiment.

FIG. 3 shows the rotor 400 of the planar drive system 200 in a bottom view of an underside of the rotor 400. In operation of the planar drive system 200, the underside of the rotor 400 is arranged facing the stator surface 303 of the stator module 300. The rotor 400 comprises a magnet arrangement 401 on the underside thereof. The magnet arrangement 401 is rectangular, in particular square, in shape and comprises a plurality of magnets. The underside of the rotor 400 is flat or planar, in particular in the area of the magnets of the magnet arrangement 401. In operation, the underside of the rotor 400 with the magnet arrangement 401 is oriented substantially parallel to the stator surface 303 and is arranged facing the stator surface 303.

The magnet assembly 401 comprises a first magnet assembly 411, a second magnet assembly 413, a third magnet assembly 415, and a fourth magnet assembly 417. The first magnet assembly 411 and the third magnet assembly 415 each comprise elongated drive magnets arranged side-by-side in a first rotor direction 407 and extending along a second rotor direction 409 oriented perpendicularly with regard to the first rotor direction 407. The second magnet assembly 413 and the fourth magnet assembly 417 each have elongated drive magnets arranged side by side in the second rotor direction 409 and extending along the first rotor direction 407. In operation, the first magnet assembly 411 and the third magnet assembly 415 serve to drive the rotor 400 in the first rotor direction 407, and the second magnet assembly 413 and the fourth magnet assembly 417 serve to drive the rotor 400 in the second rotor direction 409. Furthermore, the first magnet assembly 411, the second magnet assembly 413, the third magnet assembly 415, and the fourth magnet assembly 417 serve a drive in a direction perpendicularly with regard to the stator surface 303 and perpendicularly with regard to both the first direction 507 and the second direction 509.

In the center of the magnet arrangement 401, the rotor 400 comprises a clearance area 403 that is not covered by magnets of the magnet arrangement 401. In the area of the free surface 403, the rotor 400 has a fastening structure 405. Alternatively, further components may be arranged on the free surface 403.

Figure 4:
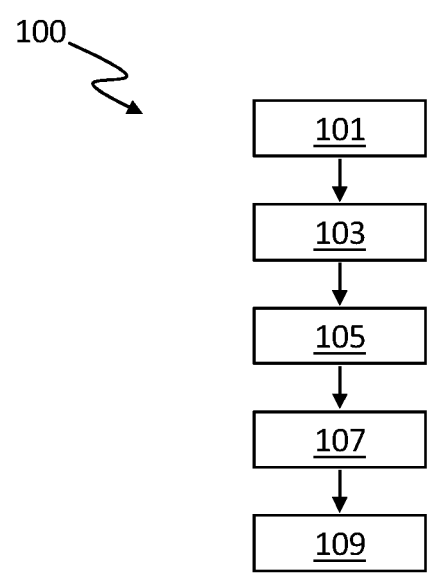
FIG. 4 shows a flowchart of a method for controlling a planar drive system according to an embodiment.

FIG. 4 shows a flowchart of a method 100 for controlling a planar drive system 200 according to an embodiment.

The method 100 for controlling a planar drive system 200 is applicable to a planar drive system 200 according to the embodiments in FIG. 1 to FIG. 3.

According to the embodiment shown in FIG. 4, a planar drive system 200 comprises at least a controller 201, a stator module 300, and a rotor 400, wherein the stator module 300 comprises a plurality of electrically energizable stator conductors 309 for generating magnetic stator fields for electrically controlling the rotor 400, wherein the rotor 400 comprises a magnet arrangement 401 for generating a magnetic rotor field, wherein a magnetic coupling between the rotor 400 and the stator module 300 is achievable via the magnetic stator field and the magnetic rotor field, wherein the stator module 300 comprises a sensor module 500 with a plurality of magnetic field sensors 501 for determining a position of the rotor 400, wherein the magnetic field sensors 501 are arranged in a two-dimensional array on the stator module 300, and wherein each magnetic field sensor 501 is arranged to determine the magnetic rotor field for a spatial region 502 in the two-dimensional array.

According to the embodiment in FIG. 4, the method 100 comprises the method steps:

determining a plurality of values of magnetic stator fields for a plurality of different energizing currents and for a plurality of spatial regions 502 in the two-dimensional array of magnetic field sensors 501 in a first magnetic stator field determining step 101;

generating at least one magnetic stator field by applying corresponding energizing currents to corresponding stator conductors 309 to electrically control the rotor 400 in a magnetic stator field generating step 103;

determining a plurality of measurements of a total magnetic field via a plurality of magnetic field sensors 501 for a plurality of spatial regions 502 of the sensor module 500 to determine a position of the rotor 400 in a total magnetic field determining step 105, wherein the total magnetic field comprises a superposition of the plurality of magnetic stator fields and the magnetic rotor field;

compensating contributions of the magnetic stator fields to the measured values of the total magnetic field determined by the magnetic field sensors 501 and generating measured values of the magnetic rotor field determined by the respective magnetic field sensors 501 for the respective spatial region 502 in a compensating step 107, wherein the compensating comprises subtracting the values of the magnetic stator fields determined for the energizing currents from the measured values of the total magnetic field determined by the magnetic field sensors 501; and determining a position of the rotor 400 based on the generated measurements of the magnetic rotor field in a position determining step 109.

According to the embodiment shown in FIG. 4, a plurality of values of magnetic stator fields for a plurality of different energizing currents and for a plurality of spatial regions 502 in the two-dimensional array of magnetic field sensors are determined in a first magnetic stator field determining step 101.

For example, in order to determine the plurality of values of magnetic stator fields, different energizing currents may be applied to a plurality of stator conductors 309 of the stator module 300 to generate corresponding magnetic stator fields through the respective stator conductors 309. The generated magnetic stator fields may subsequently be measured for different spatial regions 502 of the stator module 300, and thus values of different magnetic stator fields for different energizing currents may be determined. For example, measurements of the magnetic stator fields may be carried out by the magnetic field sensors 501 of the sensor module 500. Thus, a plurality of measured values of different magnetic stator fields for different energizing currents may be determined for each spatial region 502 of a magnetic field sensor 501.

This plurality of values of magnetic stator fields for different energizing currents may be combined in a data set or a plurality of data sets and e.g. stored in the controller 201 of the planar drive system 200. The respective data sets may thus document correlations between the energizing currents applied to the individual stator conductors 309 of the stator module 300 and values of magnetic stator fields measured in the spatial regions 502 of the two-dimensional array of magnetic field sensors 501. The correlations between applied energizing currents and values of magnetic stator fields measured in the respective spatial regions 502 may later be used to compensate the contributions of the magnetic stator fields to measured values of a total magnetic field by the magnetic field sensors 501 in the respective spatial regions 502.

Alternatively, a plurality of measurements of different magnetic stator fields for different energizing currents may be performed for only one spatial region 502 of the stator module 300, and thus a plurality of values of different magnetic stator fields may be generated for the one particular spatial region 502. Based on these values of different magnetic stator fields for different energizing currents for the one particular spatial region 502 of the two-dimensional array of magnetic field sensors 501, values of the magnetic stator fields for different spatial regions 502 may be extrapolated according to a previously determined spatial allocation. Based on the spatial allocation, which makes it possible to predict corresponding values of the magnetic stator fields for any other spatial regions 502 based on the values of the magnetic stator fields determined for the one spatial region 502, values of magnetic stator fields for any energizing currents may thus be generated for any spatial regions 502 of the two-dimensional array of magnetic field sensors 501. These may also be stored in a data set or a plurality of data sets and used for compensation.

The allocation and generation of values of different magnetic stator fields for any spatial regions 502 of the stator module 300 may e.g. be performed using a suitably trained neural network. Based on values of different magnetic stator fields determined for one spatial region 502 or for a smaller number of spatial regions 502, this allows to predict corresponding values of the magnetic stator fields for any number of spatial regions 502 of the stator module 300.

As an alternative to the discrete relationships documented in the data sets between energizing currents and values of the corresponding magnetic stator fields for various spatial regions 502 of the stator module 300, corresponding model descriptions of dependencies between energizing currents and magnetic stator fields, in particular between energizing currents and values of the magnetic stator fields for individual spatial regions 502 of the stator module 300, may be determined. Such determined model descriptions allow for determining values of different magnetic stator fields for arbitrary energizing currents, in particular for energizing currents that were not considered during the measurement of the plurality of magnetic stator fields.

Determining values of different magnetic stator fields for different energizing currents may be performed for a plurality of stator conductors 309 of the stator module 300. In particular, a corresponding determination of different magnetic stator fields for different energizing currents may be carried out for each individual stator conductor 309 of the stator module 300.

Determining values of different magnetic stator fields for different energizing currents may be carried out for all spatial regions 502 of the stator module 300. Alternatively, the determination of values of different magnetic stator fields for different energizing currents may be performed only for a previously selected plurality of spatial regions 502 that are of increased relevance for the position determination or control of the rotor 400.

To determine the values of the magnetic stator fields for different room areas 502, measurements of the individual magnetic field sensors 501 of the sensor module 500 of the corresponding room areas 502 may be performed. For this purpose, in particular, a corresponding plurality of measured values may be recorded for each spatial area 502 by the respective magnetic field sensor 501. Alternatively, measured values may be recorded only for a specific plurality of spatial areas 502 by the corresponding magnetic field sensors 501. Alternatively, measured values of the different magnetic stator fields for different spatial regions 502 may be recorded by sensors that are not magnetic field sensors 501 of the sensor module 500 of the stator module 300. For example, measurements may be taken by an external sensor measurement arrangement and thereby determine the plurality of values of different magnetic stator fields.

The created data sets with the determined values of the different magnetic stator fields for the different energizing currents and the different spatial regions 502 of the stator module 300 may be stored in further data processing units or data storage units of the planar drive system 200 in addition to the controller 201.

The first magnetic stator field determining step 101 may be carried out before the planar drive system 200, in particular the stator module 300, is put into operation. For example, a determination of the magnetic stator fields according to the first magnetic stator field determining step 101 may be performed on site after production of the corresponding components, in particular the stator module 300. Alternatively, a determination of the values of the different magnetic stator fields may be performed after the planar drive system 200 has been put into operation and for an already installed stator module 300. In particular, determining the values of the magnetic stator fields according to the first magnetic stator field determining step 101 may be carried out while the planar drive system 200 is in operation. For example, a corresponding determination according to the first magnetic stator field determining step 101 may be performed each time the planar drive system 200 is put into operation or set or started. Alternatively, the first magnetic stator field determining step 101 may be performed according to a predetermined schedule, e.g. during maintenance of the planar drive system 200.

After performing the first magnetic stator field determining step 101, a magnetic stator field generating step 103 generates magnetic stator fields for controlling the rotor 400 by applying corresponding energizing currents to a plurality of stator conductors 309 of the stator module 300. By applying the energizing currents to the corresponding stator conductors 309 and thereby generating the corresponding magnetic stator fields, appropriate positioning of the rotor 400 on the stator module 300 may be achieved. For an accurate positioning of the rotor 400 by the correspondingly generated magnetic stator fields, a position determination of the rotor 400 relative to the stator module 300 is necessary.

For this purpose, a plurality of measured values of an overall magnetic field are recorded by a plurality of magnetic field sensors 501 for the respective spatial regions 502 of the stator module 300 in an overall magnetic field determining step 105. The recording of the measured values by the magnetic field sensors 501 in the total magnetic field determining step 105 serves to determine values of the magnetic rotor field of the rotor 400 for the corresponding spatial regions 502 of the magnetic field sensors 501 respectively recording the measured values. However, by accessing the rotor 400 using the stator module 300 by driving the corresponding magnetic stator fields, the magnetic field sensors 501 are not capable of exclusively measuring the magnetic rotor field of the rotor 400.

Instead, the magnetic field sensors 501 measure an overall magnetic field that includes a superposition of the magnetic stator fields of the stator module 300 in addition to the magnetic rotor field of the rotor 400. Due to the superposition of the magnetic rotor field with the magnetic stator fields required for controlling the rotor 400, the magnetic field sensors 501 falsify the measured values of the magnetic rotor field. This makes it difficult to determine the position of the rotor 400 relative to the stator module 300 due to the distorted measured values of the magnetic field sensors 501 of the magnetic rotor field of the rotor 400 for the spatial areas 502 of the respective magnetic field sensors 501. Thus, in order to determine the magnetic rotor field from the measured values of the total magnetic field of the individual magnetic field sensors 501 for the respective spatial regions 502, compensation of the contributions of the magnetic stator fields to the measured values of the individual magnetic field sensors 501 is required.

For this purpose, in a compensating step 107, a compensation of the contributions of the magnetic stator fields of the stator module 300 to the measured values of the total magnetic field determined by the magnetic field sensors 501 for the respective spatial regions 502 of the stator module 300 is carried out. In this case, a compensation comprises a subtraction of the values of the magnetic stator fields for the respective spatial regions 502 determined in the first magnetic stator field determining step 101 from the measured values of the total magnetic field for the respective spatial regions 502 determined in the total magnetic field determining step 105. Based on the superposition of the magnetic stator fields and the magnetic rotor field, values of the magnetic rotor field may be generated by subtracting the values of the magnetic stator fields for the respective spatial regions 502 determined in the first magnetic stator field determining step 101 from the measured values of the total magnetic field for the respective spatial regions 502.

For this purpose, e.g. the measured values of the total magnetic field recorded for the individual spatial areas 502 by the respective magnetic field sensors 501 may be combined and processed, e.g. by the controller 201 with the respective data sets of the values of the magnetic stator fields generated in the first magnetic stator field determining step 101 for the respective spatial areas 502. Alternatively, the compensation may be carried out by another data processing unit of the planar drive system 200 in addition to the controller 201. Compensation of the contributions of the various magnetic stator fields to the measured values of the total magnetic field of the individual magnetic field sensors 501 and the associated generation of the values of the magnetic rotor field for the respective spatial regions 502 may thus be carried out after each measurement of the total magnetic field by the respective magnetic field sensors 501. A corresponding data transmission of the recorded measured values to the controller 201 may be realized by the data connection 203.

The compensation of the contributions of the magnetic stator fields to the measured values of the total magnetic field measured by the individual magnetic field sensors 501 comprises a compensation of the magnetic field strengths or the amplitudes of the measured magnetic flux density as well as a compensation of the contributions to the magnetic field directions or the angles of the measured magnetic flux densities. The values of the magnetic rotor field generated in compensating step 107 are thus adjusted from the respective contributions of the magnetic stator fields with respect to the magnetic field strength or the amplitude as well as with respect to the magnetic field direction or the angle. This allows to precisely determine the magnetic rotor field for the individual spatial regions 502 of the stator module 300.

After generating the values of the magnetic rotor field in the compensating step 107, a position determining step 109 performs a position determination of the rotor 400 relative to the stator module 300 based on the generated values of the magnetic rotor field for the individual spatial regions 502 of the stator module 300. Due to the measured values of the magnetic field sensors 501, which are adjusted in the compensating step 107 and which indicate adjusted values of the magnetic rotor field of the rotor 400 after successful compensation, a precise position determination and, associated therewith, a precise positioning based on the measured values of the magnetic rotor field for the respective spatial areas 502 of the stator module 300 and, thus, a precise control of the rotor 400 is allowed for.

Figure 5:
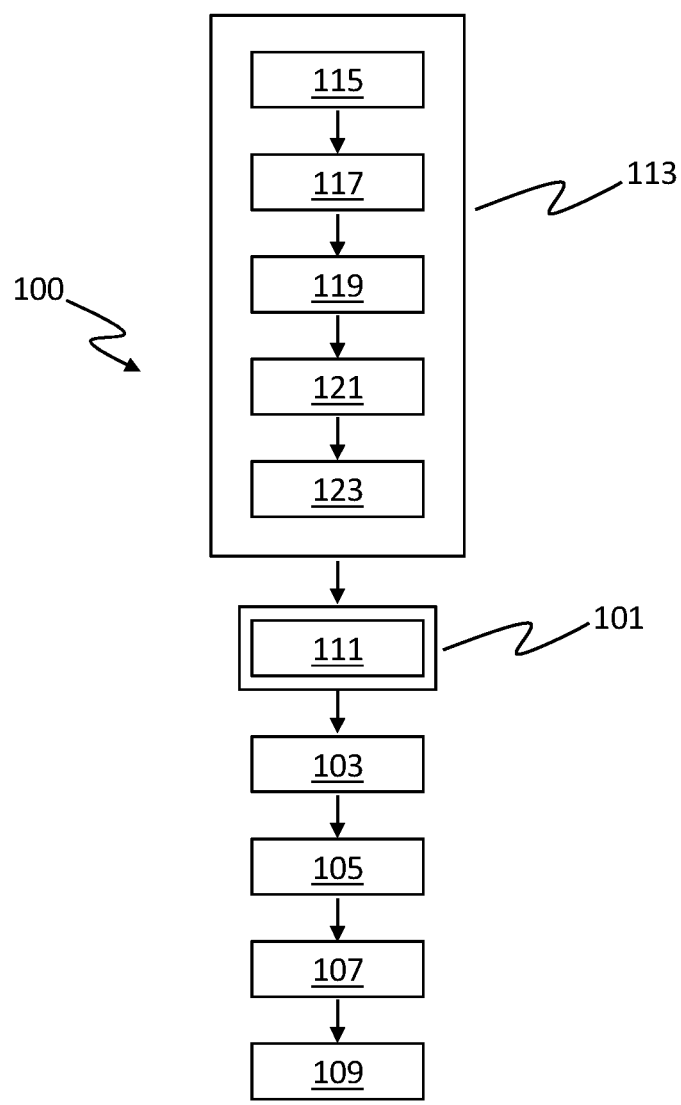
FIG. 5 is another flowchart of a method for controlling a planar drive system according to an embodiment.

FIG. 5 shows another flowchart of the method 100 for controlling a planar drive system 200 according to an embodiment.

The embodiment shown in FIG. 5 is based on the embodiment in FIG. 4 and comprises all the method steps of the embodiment in FIG. 4. The method steps described for FIG. 4 are not described again in detail again below to avoid unnecessary repetition.

Deviating from the embodiment in FIG. 4, the embodiment in FIG. 5 further comprises a calibrating step 113 for calibrating the stator conductors 309 of the stator module 300. In the embodiment in FIG. 5, the calibrating step 113 comprises a target magnetic stator field determining step 115 for this purpose. In the target magnetic stator field determining step 115, a plurality of target magnetic stator fields for a plurality of target energizing currents for a plurality of stator conductors 309 are determined. Here, a target magnetic stator field of a stator conductor 309 corresponds to a magnetic field of an ideal reference conductor having the same parameters as the respective stator conductor 309 for a respective target energizing current. The parameters of the stator conductor 309 may be characteristics of the conductor material of the stator conductor 309 or windings of the stator conductor 309, if it is embodied as a coil.

The target magnetic stator field thus corresponds to the magnetic field that would be expected for an ideal stator conductor 309 for a corresponding target energizing current applied to the stator conductor 309. In this case, ideal means that the respective stator conductor 309 has no substantial production-related inaccuracies or deviations from its defined characteristics. Furthermore, the ideal stator conductor 309 is arranged at the desired position on the stator module 300, so that it also has no substantial position-related deviations.

In the target magnetic stator field determining step 115, corresponding target magnetic stator fields may be determined for all stator conductors 309 of the stator module 300. Alternatively, corresponding target magnetic stator fields may be determined for only a selected plurality of stator conductors 309. The target magnetic stator fields may be determined for any number of different target energizing currents. The target magnetic stator fields may be carried out in the target magnetic stator field determining step 115, e.g. by taking corresponding measurements on corresponding ideal reference conductors.

After determining the target magnetic stator fields in the target magnetic stator field determining step 115, real magnetic stator fields are generated in a generating step 117 on the basis of the target energizing currents. Here, a real magnetic stator field of a stator conductor 309 is the magnetic field that is actually generated by the respective stator conductor 309 when a respective reference energizing current is applied. If the respective stator conductor 309 is not an ideal reference conductor, the real magnetic stator field of the respective stator conductor 309 deviates from the reference magnetic stator field determined in the reference magnetic stator field determining step 115 for the respective reference energizing current. A deviation may occur in particular both in the form of the magnetic field strength or the amplitude of the measured magnetic flux density and in the magnetic field direction or the angle of the measured magnetic flux density for any point in space. The target magnetic stator field as well as the real magnetic stator field may comprise homogeneous and/or inhomogeneous field components. In the generating step 117, real magnetic stator fields are thus generated for the individual stator conductors 309 of the stator module 300 by applying the corresponding target energizing currents from the target magnetic stator field determining step 115.

In a second magnetic stator field determining step 119, the values of the real magnetic stator fields generated in the generating step 117 are determined. This may e.g. be done by taking a plurality of measurements from a plurality of magnetic field sensors 501 of the sensor module 500. Alternatively, the determination of the values of the real magnetic stator fields in the second magnetic stator field determining step 119 may be performed by an external sensor unit, that is, by a sensor unit that is not a magnetic field sensor 501 of the sensor module 500.

In an allocating step 121, allocations between the target energizing currents and the corresponding real magnetic stator fields determined in the second magnetic stator field determining step 119 are defined for a plurality of stator conductors 309. The defined assignments allow the real magnetic stator field of each of the plurality of stator conductors 309 to be determined for each of the target exciter currents. By respectively allocating between the reference energizing currents and the corresponding real magnetic stator fields for each of the plurality of stator conductors 309, each stator conductor 309 may be driven with respect to the real magnetic stator field generated by the respective stator conductor 309 by applying a corresponding reference energizing current to the respective stator conductor 309.

Subsequently, in an energizing current determining step 123, corresponding real energizing currents are determined for each of the plurality of stator conductors 309 based on the assignments determined in the assigning step 121. Here, a real energizing current of a stator conductor 309 corresponds to a target energizing current to be applied to the respective stator conductor 309 to generate the respective real stator field of the corresponding stator conductor 309.

The real energizing currents defined in the energizing current determining step 123 and the real magnetic stator fields determined in the second magnetic stator field determining step 119 for each of the plurality of stator conductors 309 may be combined into corresponding data sets. Based on the data sets, each of the plurality of stator conductors 309 may be appropriately driven by applying a real energizing current to generate a corresponding real magnetic stator field of the respective stator conductor 309 having a desired field strength and direction. The generated data sets may e.g. be stored in the controller 201 of the planar drive system 200 for driving the stator module 300.

Alternatively, the data sets may be stored in the control module of the stator module 300. The values of the real magnetic stator fields stored in the data sets may include values of a magnetic field strength of the magnetic stator field or an amplitude of the respective measured magnetic flux density, and a magnetic field direction of the magnetic stator field or an angle of the measured magnetic flux density.

By calibrating the stator conductors 309 of the stator module 300, precise control of the rotor 400 may be produced by generating exactly the desired magnetic stator fields by applying the respective real energizing currents to the corresponding stator conductors 309.

In contrast to the embodiment in FIG. 4, in the embodiment in FIG. 5 the first magnetic stator field determining step 101 comprises a model determining step 111. In the model determining step 111, model descriptions of dependencies between the energizing currents and the magnetic stator fields of the individual stator conductors 309 are determined. Based on the model descriptions, magnetic stator fields for arbitrary energizing currents may be determined for the individual stator conductors 309. Compensation of the contributions of the magnetic stator fields of the stator conductors 309 in the compensating step 107 may be performed based on the model descriptions determined in the model determining step 111.

A model description may e.g. comprise a mathematical function or a mathematical relation by which assignments between energizing currents and magnetic stator fields are made possible. Based on the model descriptions, expected values of corresponding magnetic stator fields may be determined for any stator conductors 309 and for any spatial points, in particular for any spatial regions 502 of any magnetic field sensors 501.

According to an embodiment, the model descriptions may comprise at least an appropriately trained neural network. Alternatively, the model descriptions may comprise a plurality of appropriately trained neural networks. Via the neural networks, allocations between energizing currents and magnetic stator fields may be created. Alternatively, the appropriately trained neural networks may be used to determine expected values of corresponding magnetic stator fields for any stator conductors 309 and for any spatial points, in particular for any spatial regions 502 of any magnetic field sensors 501. The neural networks may in this context be trained with the described data sets.

Calibration of the stator conductors 309 may further correct a deviation in the real magnetic fields generated by the stator conductors 309 due to an incorrect current measurement of the applied energizing currents.

Figure 6:
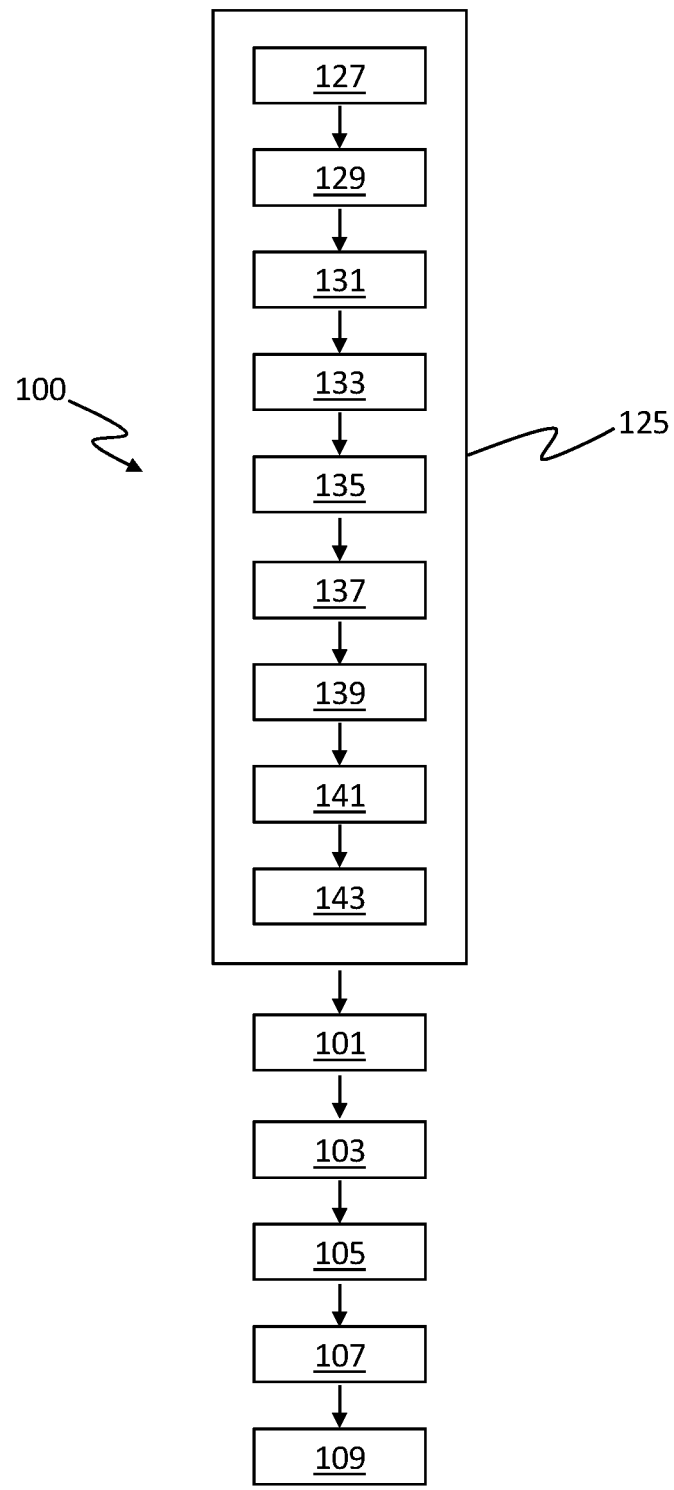
FIG. 6 shows another flowchart of a method for controlling a planar drive system according to an embodiment.

FIG. 6 shows another flowchart of the method 100 for controlling a planar drive system 200 according to another embodiment.

The embodiment in FIG. 6 is based on the embodiment in FIG. 4 and comprises all method steps of the embodiment shown in FIG. 4. To avoid unnecessary repetition, the method steps described for FIG. 4 are not described again in detail below.

Deviating from the embodiment in FIG. 4, the embodiment in FIG. 6 further comprises a sensor calibrating step 125. In the sensor calibrating step 125, the magnetic field sensors 501 of the sensor module 500 are calibrated.

For this purpose, the sensor calibrating step 125 comprises a first reference magnetic field generating step 127. In the first reference magnetic field generating step 127, a first reference magnetic field is generated. Values for a plurality of spatial regions 502 of the stator module 300 are known for the first reference magnetic field. For example, the first reference magnetic field may be the magnetic rotor field of the rotor 400. Alternatively, the first reference magnetic field may be a magnetic stator field of the stator module 300. Alternatively, the first reference magnetic field may be a magnetic field of an external magnetic field arrangement for which values are known for respective spatial regions 502 of the stator module 300. For example, the external magnetic field array may be a test arrangement with a magnetic field source that generates a magnetic field of known characteristics.

After generating the first reference magnetic field, a first reference magnetic field determining step 129 determines a plurality of measured values of the first reference magnetic field for a plurality of spatial regions 502 of the stator module 300. This is effected by recording a plurality of measured values by respective magnetic field sensors 501 of respective spatial regions 502 of the stator module 300. For this purpose, the rotor 400 may e.g. be moved over the stator module 300 and measured values of the magnetic rotor field of the rotor 400 may be recorded by the respective magnetic field sensors 501 of the sensor module 500 for the respective spatial regions 502 of the magnetic field sensors 501. Alternatively, corresponding energizing currents may be applied to the respective stator conductors 309 of the stator module 300 to generate corresponding magnetic stator fields that are measured by the respective magnetic field sensors 501 for the corresponding spatial regions 502.

After establishing the measured values of the first reference magnetic field by the plurality of magnetic field sensors 501, a deviation determining step 131 for the plurality of magnetic field sensors 501 determines deviations of the measured values of the reference magnetic field obtained by the magnetic field sensors 501 from the actual values of the first reference magnetic field for the respective spatial areas 502 of the corresponding magnetic field sensors 501. The actual values of the first reference magnetic field are the known values of the first reference magnetic field for a plurality of spatial regions 502.

After determining the deviations of the measured values of the individual magnetic field sensors 501 from the actual values of the first reference magnetic field for the respective spatial areas 502, corrections of the measured values determined by the magnetic field sensors 501 are carried out in a first correcting step 133. The corrections may e.g. comprise the subtraction of an offset or, alternatively, the multiplication of the recorded measured values by a corresponding correction factor.

The corrections in the first correcting step 133 may be carried out by a suitably trained neural network or by a plurality of suitably trained neural networks.

The first reference magnetic field may comprise different magnetic field strengths and magnetic field directions. Thus, for each magnetic field sensor 501, unique correlations between recorded measured values and actual values of the first reference magnetic field may be determined. The determined correlations may be summarized in corresponding data sets for each magnetic field sensor 501. The respective data sets may e.g. be stored in the controller 201 of the planar drive system 200. Alternatively, the data sets may be stored in the control module of the stator module 300.

The sensor calibrating step 125 further comprises a temperature determining step 135 in which a plurality of temperatures of the stator module 300 are determined. By determining the temperatures of the stator module 300, a determination of temperatures of the individual magnetic field sensors 501 of the sensor module 500 may be achieved.

Subsequently, a second reference magnetic field is generated in a second reference magnetic field generating step 137. The second reference magnetic field may be the magnetic rotor field of the rotor 400, analogous to the first reference magnetic field. Alternatively, the second reference magnetic field may be a magnetic stator field of the stator module 300. Alternatively, the second reference magnetic field may be a magnetic field of an external magnet assembly.

After generating the second reference magnetic field in the second reference magnetic field generating step 137, a plurality of measured values of the second reference magnetic field are determined by a plurality of measurements of a plurality of magnetic field sensors 501 in a second reference magnetic field determining step 139. In analogy to the first reference magnetic field determining step 129, any measurements of any number of magnetic field sensors 501 may be performed here to determine corresponding values of the second reference magnetic field for the respective spatial regions 502 of the magnetic field sensors 501. The individual measurements of the second reference magnetic field for the respective spatial regions 502 of the magnetic field sensors 501 are in this context carried out for a plurality of different temperatures of the stator module 300, so that different measured values of the second reference magnetic field are recorded for individual magnetic field sensors 501 for different temperatures of the stator module 300.

After the plurality of measured values are recorded by the different magnetic field sensors 501 for the different temperatures of the stator module 300, temperature dependencies between the measured values of the respective magnetic field sensors 501 of the second reference magnetic field and the actual values of the second reference magnetic field for the respective spatial regions 502 of the respective magnetic field sensors 501 are determined in a dependency determining step 141 for each magnetic field sensor 501. Based on the temperature dependencies, it is thus possible to determine a temperature-related deviation of the measured values recorded by the magnetic field sensors 501 from the actual values of the applied second reference magnetic field for the respective spatial areas 502 of the respective magnetic field sensors 501.

Subsequently, in a second correcting step 143, measured values of the respective magnetic field sensors 501 are corrected on the basis of the determined temperature dependencies of the individual magnetic field sensors 501. The corrections may comprise measured values of the total magnetic field, measured values of the magnetic rotor field and/or measured values of the magnetic stator field of the individual magnetic field sensors 501.

The temperature dependencies determined in the dependency determining step 141 may be expressed by corresponding mathematical models comprising a continuous temperature dependency for different temperatures in a temperature range of deviations of the measured values of individual magnetic field sensors 501 to actually applied magnetic fields. The corrections in the second correcting step 143 may be carried out based on the model descriptions of the temperature dependencies. The temperature dependencies may be summarized in respective data sets for individual magnetic field sensors 501. The respective data sets may e.g. be stored in the controller 201 or in the control module of the stator module 300 or in an external data processing unit or data storage unit.

The different temperatures in the temperature determining step 135 may e.g. be implemented by heating or cooling the stator module 300. The heating of the stator module 300 may be realized by the heat losses of the stator conductors 309 or by an external heat source, wherein the former would be possible during operation of the planar drive system. The second correcting step 143 may compensate for temperature-related influences on the measured values of the magnetic field sensors 501. In this way, an increase in the measurement accuracy of the individual magnetic field sensors 501 may in turn be achieved. This, in turn, contributes to an improvement in the accuracy of the position determination of the rotor 400 and, associated with this, to an improvement in the control of the rotor 400.

Alternatively, the first reference magnetic field and the second reference magnetic field may be an identical magnetic field.

By performing the sensor calibrating step 125, sensor-internal errors as well as incorrect positioning of the magnetic field sensors 501 in the sensor module 500 of the stator module 300 may be corrected. Furthermore, temperature-related inaccuracies of the individual magnetic field sensors 501 may be compensated. This may result in increased precision and measurement accuracy of the magnetic field sensors 501.

Figure 7:
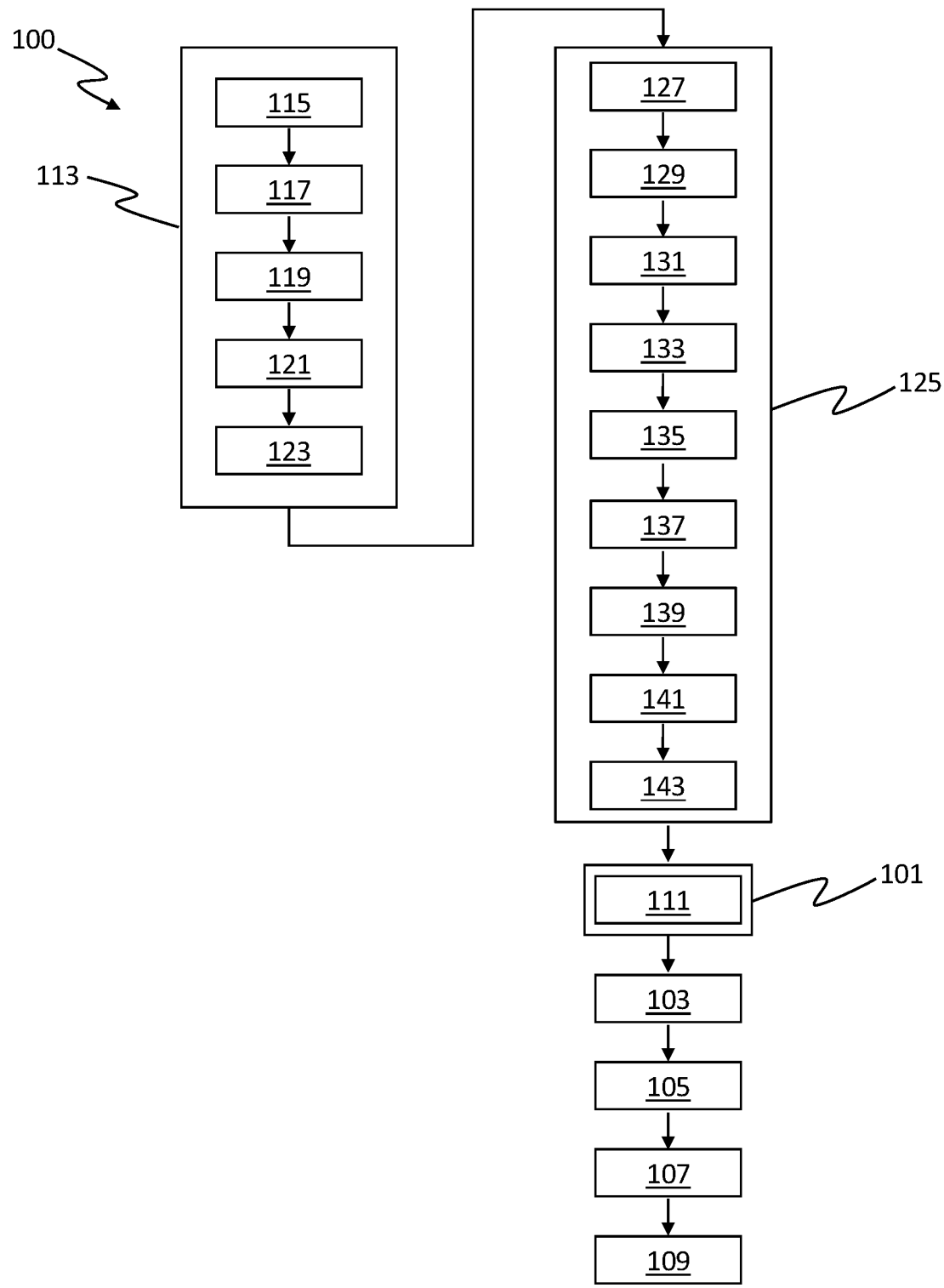
FIG. 7 shows another flowchart of a method for controlling a planar drive system according to an embodiment.

FIG. 7 shows another flowchart of the method 100 for controlling a planar drive system 200 according to another embodiment.

The embodiment in FIG. 7 corresponds to a combination of the embodiments in FIG. 5 and FIG. 6.

By calibrating the stator conductors 309 in the calibrating step 113 and by calibrating the magnetic field sensors 501 in the sensor calibrating step 125, an improved compensation of the contributions of the magnetic stator fields to the measured values of the total magnetic field of the individual magnetic field sensors 501 may be achieved in the compensating step 107. As a result of the improved compensation due to the increased measurement accuracy of the magnetic field sensors 501 and the improved knowledge of the magnetic stator fields generated by the stator conductors 309 of the stator module 300, an improved position determination of a position of the rotor 400 relative to the stator module 300 and, consequently, an improved control of the rotor 400 may be achieved.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals

| |
|---|
| 100 method for controlling a planar drive system |
| 101 first magnetic stator field determining step |
| 103 magnetic stator field generating step |
| 105 total magnetic field determining step |
| 107 compensating step |
| 109 position determining step |
| 111 model determining step |
| 113 calibrating step |
| 115 target magnetic stator field determining step |
| 117 generating step |
| 119 second magnetic stator field determining step |
| 121 allocating step |
| 123 energizing current determining step |
| 125 sensor calibrating step |
| 127 first reference magnetic field generating step |
| 129 first reference magnetic field determining step |
| 131 deviation determining step |
| 133 first correcting step |
| 135 temperature determining step |
| 137 second reference magnetic field generating step |
| 139 second reference magnetic field determining step |
| 141 dependency determining step |
| 143 second correcting step |
| 200 planar drive system |
| 201 controller |
| 203 data connection |
| 300 stator module |
| 301 carrier |
| 303 stator surface |
| 305 stator module housing |
| 307 stator assembly |
| 309 stator conductor |
| 311 stator conductor gap |
| 313 sectional plane |
| 315 connecting line |
| 332 stator module underside |
| 400 rotors |
| 401 magnet array |
| 403 free surface |
| 405 fastening structure |
| 407 first rotor direction |
| 409 second rotor direction |
| 411 first magnet assembly |
| 413 second magnet assembly |
| 415 third magnet assembly |
| 417 Fourth magnet assembly |
| 500 sensor module |
| 501 magnetic field sensor |
| 502 spatial region |
| 503 first periodic lattice |
| 505 second periodic lattice |
| 507 first direction |
| 509 second direction |
| 511 first magnetic field sensor |
| 513 second magnetic field sensor |

The invention claimed is:

1. A method for controlling a planar drive system, wherein the planar drive system comprises at least a controller, a stator module and a rotor, wherein the stator module comprises a plurality of electrically energizable stator conductors for generating magnetic stator fields for electrically controlling the rotor, wherein the rotor comprises a magnet arrangement for generating a magnetic rotor field, wherein a magnetic coupling between the rotor and the stator module is achievable via the magnetic stator field and the magnetic rotor field, wherein the stator module comprises a sensor module having a plurality of magnetic field sensors for determining a position of the rotor, wherein the magnetic field sensors are arranged in a two-dimensional array at the stator module, and wherein each magnetic field sensor is configured to determine, for a spatial region in the two-dimensional array, the magnetic rotor field;

the method comprising:

determining a plurality of values of magnetic stator fields for a plurality of different energizing currents and for a plurality of spatial regions in the two-dimensional array of magnetic field sensors in a first magnetic stator field determining step, wherein the first magnetic stator field determining step comprises:

determining model descriptions of dependencies between energizing currents and magnetic stator fields of the stator conductors in a model determining step;

generating at least one magnetic stator field by applying corresponding energizing currents to corresponding stator conductors to electrically control the rotor in a magnetic stator field generating step;

determining a plurality of measured values of a total magnetic field by a plurality of magnetic field sensors for a plurality of spatial regions of the sensor module to determine a position of the rotor in a total magnetic field determining step, wherein the total magnetic field comprises a superposition of the plurality of magnetic stator fields and the magnetic rotor field;

compensating contributions of the magnetic stator fields to the measured values of the total magnetic field determined by the magnetic field sensors and generating measured values of the magnetic rotor field determined by the respective magnetic field sensors for the respective spatial region in a compensating step, wherein compensating the contributions comprises subtracting the values of the magnetic stator fields determined for the energizing currents from the measured values of the total magnetic field determined by the magnetic field sensors, wherein the compensating step further comprises:

compensating the contributions of the magnetic stator fields to the measured values of the total magnetic field determined by the magnetic field sensors for arbitrary energizing currents based on the determined model descriptions of the dependencies between the energizing currents and the magnetic stator fields of the stator conductors;

wherein compensating the contributions in the compensating step is carried out by a correspondingly trained neural network, and wherein the correspondingly trained neural network is configured to compensate for each magnetic field sensor the contributions of the magnetic stator fields to the measured values of the total magnetic field determined by the respective magnetic field sensor and to determine measured values of the magnetic rotor field; and determining a position of the rotor based on the generated measured values of the magnetic rotor field in a position determining step.

2. The method according to claim 1, wherein determining the values of the magnetic stator fields in the first magnetic stator field determining step is performed by a plurality of measurements of a plurality of magnetic field sensors of the sensor module.

3. The method according to claim 1, wherein:

in the total magnetic field determining step at least one measured value of the total magnetic field is determined for each magnetic field sensor;

wherein in the compensating step contributions of the magnetic stator fields to the measured values of the total magnetic field are compensated for each magnetic field sensor, and wherein for each magnetic field sensor at least one measured value of the magnetic rotor field is generated for the spatial region of the respective magnetic field sensor.

4. The method according to claim 1, wherein:

in the model determining step, for each stator conductor an individual model description of the dependence between the energizing currents applied to the respective stator conductor and the magnetic stator fields generated by the respective stator conductor is determined, and wherein, in the compensating step, the contributions of the magnetic stator fields to the measured values of the total magnetic field determined by the respective magnetic field sensor are compensated for each magnetic field sensor on the basis of the models created, and measured values of the magnetic rotor field are determined.

5. The method according to claim 1, wherein:

the model description of the dependence between the energizing currents applied to the respective stator conductor and the magnetic stator fields generated by the respective stator conductor in the model determining step comprises a correspondingly trained neural network, and wherein the correspondingly trained neural network is set up to determine values of the corresponding magnetic stator field for any stator conductor and any energizing currents for any spatial regions of any magnetic field sensors.

6. The method according to claim 1, further comprising calibrating the stator conductors in a calibrating step.

7. The method according to claim 6, wherein the calibrating step comprises:

determining a plurality of target magnetic stator fields for a plurality of target energizing currents for a plurality of stator conductors in a target magnetic stator field determining step, wherein a target magnetic stator field of a stator conductor corresponds to a magnetic field of an ideal reference conductor having the same parameters as the respective stator conductor for a respective target energizing current;

generating, on the basis of the reference energizing currents, real magnetic stator fields of the stator conductors in a generating step, wherein a real magnetic stator field of a stator conductor is a magnetic field generated by the respective stator conductor for the respective reference energizing current;

determining values of the real magnetic stator fields for the desired energizing currents of the plurality of stator conductors in a second magnetic stator field determining step;

defining allocations between the target exciter currents and the corresponding real magnetic stator fields for a plurality of stator conductors in an allocating step; and determining, based on the allocations, real energizing currents for the plurality of stator conductors in an energizing current determining step, wherein a real energizing current of a stator conductor corresponds to a target energizing current for which the respective stator conductor generates a corresponding real magnetic stator field.

8. The method according to claim 7, wherein determining the values of the real magnetic stator fields in the second magnetic stator field determining step is carried out by a plurality of measurements of a plurality of magnetic field sensors of the sensor module.

9. The method according to claim 1, further comprising calibrating the magnetic field sensors in a sensor calibrating step.

10. The method of claim 9, wherein the sensor calibrating step comprises:

generating a first reference magnetic field in a first reference magnetic field generating step, wherein values of the first reference magnetic field are known for a plurality of spatial regions of the stator module;

determining measured values of the reference magnetic field for a plurality of spatial regions of the stator module via a plurality of magnetic field sensors in a first reference magnetic field determining step;

determining, for a plurality of magnetic field sensors, deviations of the measured values of the reference magnetic field determined by the magnetic field sensors from the known values of the reference magnetic field in the respective spatial regions in a deviation determining step; and correcting, on the basis of the determined deviations, the measured values of the total magnetic field and/or the magnetic rotor field and/or the magnetic stator fields determined by the magnetic field sensors in a first correcting step.

11. The method according to claim 9, wherein the sensor calibrating step further comprises:

determining a plurality of different temperatures of the stator module in a temperature determining step;

generating a second reference magnetic field in a second reference magnetic field generating step, wherein values of the second reference magnetic field are known for a plurality of spatial regions;

determining, via a plurality of magnetic field sensors, a plurality of measured values of the second reference magnetic field for the plurality of temperatures and a plurality of spatial regions in a second reference magnetic field determining step;

determining temperature dependencies of the measured values of the second reference magnetic field determined by the magnetic field sensors based on the values of the second reference magnetic field in a dependency determining step; and correcting the measured values of the total magnetic field and/or the magnetic rotor field and/or the magnetic stator fields determined by the magnetic field sensors on the basis of the determined temperature dependencies in a second correcting step.

12. The method according to claim 9, wherein the first reference magnetic field and/or the second reference magnetic field is the magnetic rotor field of the rotor or the magnetic stator field of the stator module.

13. A planar drive system comprising at least a controller, a stator module, and a rotor, wherein the controller is arranged to execute a method according to claim 1, wherein the controller is connected to the stator module via at least one data link, wherein the stator module comprises a plurality of electrically energizable stator conductors for generating magnetic stator fields for electrically controlling the rotor, wherein the rotor comprises a magnet arrangement for generating a magnetic rotor field, wherein a magnetic coupling between the rotor and the stator module is achievable via the magnetic stator field and the magnetic rotor field, wherein the stator module comprises a sensor module with a plurality of magnetic field sensors for determining a position of the rotor, wherein the magnetic field sensors are arranged in a two-dimensional array on the stator module, and wherein each magnetic field sensor is arranged to determine the magnetic rotor field for a spatial region in the two-dimensional array.

* * * * *